United States Patent
Santhoff et al.

(10) Patent No.: US 6,907,244 B2
(45) Date of Patent: Jun. 14, 2005

(54) HAND-OFF BETWEEN ULTRA-WIDEBAND CELL SITES

(75) Inventors: John H. Santhoff, Panama City Beach, FL (US); Donald W. Jolly, Panama City Beach, FL (US); Rodolfo T. Arrieta, Panama City Beach, FL (US)

(73) Assignee: Pulse-LINK, Inc., Carlsbad, CA (US)

( * ) Notice: Subject to any disclaimer, the term of this patent is extended or adjusted under 35 U.S.C. 154(b) by 522 days.

(21) Appl. No.: 09/804,110

(22) Filed: Mar. 12, 2001

(65) Prior Publication Data

US 2005/0048978 A1 Mar. 3, 2005

(Under 37 CFR 1.47)

Related U.S. Application Data

(60) Provisional application No. 60/255,469, filed on Dec. 14, 2000.

(51) Int. Cl.$^7$ ............................................. H04Q 7/20
(52) U.S. Cl. ..................... 455/442; 455/436; 370/331; 342/357.01
(58) Field of Search .................... 455/436, 442, 455/450, 67.13, 135, 161.3, 277.2, 63.3; 370/331, 333, 329, 338; 342/357.01, 357.09, 357.13, 367

(56) References Cited

U.S. PATENT DOCUMENTS

| | | | |
|---|---|---|---|
| 3,668,639 A | 6/1972 | Harmuth | 340/166 R |
| 3,678,204 A | 7/1972 | Harmuth | 179/15 BC |
| 4,506,267 A | 3/1985 | Harmuth | 343/744 |
| 4,641,317 A | 2/1987 | Fullerton | 375/1 |
| 4,651,152 A | 3/1987 | Harmuth | 342/13 |
| 4,743,906 A | 5/1988 | Fullerton | 342/27 |
| 4,813,057 A | 3/1989 | Fullerton | 375/37 |
| 4,979,186 A | 12/1990 | Fullerton | 375/23 |
| 5,134,408 A | 7/1992 | Harmuth | 342/21 |
| 5,148,174 A | 9/1992 | Harmuth | 342/21 |
| 5,153,595 A | 10/1992 | Harmuth | 342/22 |
| 5,159,343 A | 10/1992 | Harmuth | 342/22 |
| 5,307,081 A | 4/1994 | Harmuth | 343/842 |
| 5,363,108 A | 11/1994 | Fullerton | 342/27 |
| 5,365,240 A | 11/1994 | Harmuth | 343/701 |
| 5,493,691 A | 2/1996 | Barrett | 455/20 |
| 5,523,758 A | 6/1996 | Harmuth | 342/22 |
| 5,586,145 A | 12/1996 | Morgan et al. | 375/239 |
| 5,592,177 A | 1/1997 | Barrett | 342/361 |
| 5,610,907 A | 3/1997 | Barrett | 370/342 |
| 5,677,927 A | 10/1997 | Fullerton et al. | 375/200 |
| 5,687,169 A | 11/1997 | Fullerton | 370/324 |
| 5,901,172 A | 5/1999 | Fontana et al. | 375/200 |
| 6,031,862 A | 2/2000 | Fullerton et al. | 375/200 |
| 6,231,083 B1 * | 5/2001 | Marandi | 285/5 |
| 6,266,529 B1 * | 7/2001 | Chheda | 455/436 |
| 6,473,619 B1 * | 10/2002 | Kong et al. | 455/456.1 |
| 6,507,740 B2 * | 1/2003 | Shi | 455/437 |
| 6,606,497 B2 * | 8/2003 | Mohebbi | 455/437 |
| 6,686,879 B2 * | 2/2004 | Shattil | 342/367 |
| 6,728,217 B1 * | 4/2004 | Amirijoo et al. | 370/252 |

* cited by examiner

Primary Examiner—Marsha D. Banks-Harold
Assistant Examiner—Nghi H. Ly
(74) Attorney, Agent, or Firm—Pulse-LINK, Inc.

(57) ABSTRACT

Briefly, the present invention provides a dynamic channel re-assignment capability between mobile units, base stations and sectors within base station coverage areas. The wireless devices used in the present invention may include impulse radio communication devices such as, for example ultra-wideband radio (also known as digital pulse wireless) communication devices. Ultra-wideband bandwidth and channel allocation can be effectively managed, even though link quality generally deteriorates near the outer boundary of the base station. By maintaining dual communications with an adjoining base station, the present invention reduces the bit error rate and maintains signal strength (e.g., RF signal strength). This procedure is termed a "soft-handoff".

3 Claims, 11 Drawing Sheets

Mobile UWB is leaving range of Base Station "1" and is now within the range of Base Station "2"
(Transmission distances are indicated by $a_1$ and $b_1$)

Power-Range Linking Model for soft hand-off
(Mobile leaving coverage of Base Station "2")

Typical Minimum Acceptable Bit Error Rates

*Bit Error Rate and Error Correction Criteria:*

*Typical Minimum Acceptable Bit Error Rate*

Video: $10^{-5}$ *BER*

Audio: $10^{-3}$ *BER*

Data: $10^{-10}$ *BER*

FIG. 1

Base Station Architecture
(showing overlapping coverage)

Single Base Station Architecture
(showing connectivity to six other Base
Stations for handoff and channel co-ordination)

Sectorization at UWB Base Station

Soft Handoff Scenario #1: Base Station to New Base Station to Mobile Unit

Soft Handoff Scenario #2: Mobile Unit to Base Station to New Base Station

Soft Handoff Scenario #3: Performs Dynamic Power Range Linking

Mobile UWB is leaving range of Base Station "1" and is now within the range of Base Station "2"
(Transmission distances are indicated by $a_1$ and $b_1$)

Power-Range Linking Model for soft hand-off
(Mobile leaving coverage of Base Station "2")

Soft hand-off Scenario #4
(Mobile Unit to Mobile Unit to Base Station, also providing emergency geo-locationing)

Soft hand-off procedures for Scenarios 1 through 4

Adaptive Link Controller

HAND-OFF BETWEEN ULTRA-WIDEBAND CELL SITES

Priority is claimed from U.S. provisional patent application Ser. No. 60/255,469, filed on Dec. 14, 2000, entitled "Ultra-Wideband Communication System and Method", which is incorporated herein by reference in its entirety.

FIELD OF THE INVENTION

The present invention relates to the field of ultra-wideband communication systems. More particularly, the present invention relates to hand-offs between cell sites in an ultra-wideband communication system.

BACKGROUND OF THE INVENTION

Wireless communication systems are changing the way people work, entertain, and communicate. For example, portable phones and other mobile devices have enabled highly mobile individuals to easily communicate. Such devices can transmit and receive both voice and data signals. As more features are added to these mobile wireless devices, users are able to receive a wider variety of information. This enhances the user's entertainment and more efficiently solves the user's business problems.

Data, such as computer files, graphics, video, and music may be sent from a remote location and received by mobile wireless devices located throughout a large (or "wide") area. Such wide area uses generally require a series of fixed transceivers arranged to communicate with the mobile wireless devices. The wireless device is able to communicate only as long as it remains in contact with at least one of the transceivers.

While the use of such wide area systems is expanding, the use of local wireless communication systems is also growing. A local wireless communication system, for example, may configure the wireless devices in a single building, such as a residence, to share information. Such local wireless communication systems may enable computers to control peripherals without physical connections, stereo components to communicate, and almost any appliance to send and receive information to the Internet.

The amount of data being sent on both wide area and local communication systems is mushrooming, and it may quickly exceed the bandwidth available in the traditional communication bands. A relatively new communication technology (termed "ultra-wideband" technology) may provide assistance in meeting the ever-increasing bandwidth demands. An example of ultra-wideband technology is the communication system using an impulse radio system that is disclosed in U.S. Pat. No. 6,031,862, entitled "Ultra-Wideband Communication System and Method". Impulse radio uses individually pulsed monocycles emitted at fractions of nanosecond intervals to transmit a digital signal. For many applications, the pulses are transmitted at extremely low power density levels, for example, at less than −30 dB. The generated pulses are so small that they typically exist in the noise floor of other more traditional communication systems.

Ultra-Wide band communication systems enable communication at a very high data rate, such as 100 megabits per second or greater, when operated in a small local area. Ultra-Wideband systems, however, must operate at extremely low power, typically transmitting signals at the noise level. These systems must operate at low power because they need to avoid interfering with the more established communication frequencies. The low power requirement restricts the size of each ultra-wideband cell. Thus, ultra-wideband cells generally are smaller than the cells in the more traditional continuous wave or carrier based systems.

The relatively small size of a cell in an ultra-wideband communication system necessitates a relatively dense placement of base station antennas. This high density of antennas may, under some circumstances, lead to cross-talk between the channels assigned to different users. This is especially true if the users are highly mobile. In this case, they will often travel across cell boundaries where the signals of two or more base stations overlap. Since this event will be relatively frequent with such small cells, user channels must be geographically separated to minimize the occurrence of channel interference. For example, if a particular channel is used in a cell, that channel should not be used in any other cell within several miles. Accordingly, since only relatively few of the communication channels can be allocated to each cell, the reuse distance determines the total capacity of the overall cell communication system.

The utilized bandwidth in conventional cells varies as a function of user demand. Since user demand can vary greatly from one time period to another, there are likely to be times when a particular cell is greatly under-utilized. There are also likely to be other times when that same cell is saturated, thereby causing undesirable drops in transmissions, connection refusals, and quality degradation. When a cell's bandwidth utilization exceeds system quality standards in a conventional communication system, the system operator typically will add another cell in the area to move some of the user traffic from the over-utilized cell to the new cell. Adding cells and antennas, however, can be a costly and time-consuming process.

Although ultra-wideband technology has the ability to decrease the impact of multipath interference, it is still subject to attenuation of the received signal as the signal passes between transmitter and receiver. For a point RF source, received signal strength varies as the inverse of the squared distance for open line of sight communications. In cluttered and mobile environments, the attenuation is more closely proportional to the inverse of the fourth power of the distance. This is due to multipath cancellation, which is present even in ultra-wideband signals. In either scenario, the attenuation of the signal can decrease the signal level to a value that is unsuitable for reliable data transfer.

Due in part to the deficiencies described above, conventional ultra-wideband communication systems risk poor quality of service, especially as a mobile unit moves from one location to another. Such systems also do not enable entirely efficient utilization of bandwidth and system resources.

SUMMARY OF THE INVENTION

It is an object of the present invention to provide mobile ultra-wideband methods and devices for effectively linking and maintaining an acceptable level of service and coverage while simultaneously handling multiple data streams and multiple users. It is also an object of the present invention to efficiently utilize bandwidth and system resources. To meet the stated objectives, and to overcome or greatly alleviate the disadvantages in known ultra-wideband units, the present invention provides methods, systems, software and related devices for performing a "soft hand-off" between and within ultra-wideband cells.

Briefly, the present invention provides a dynamic channel re-assignment capability to mobile units, base stations and sectors within base station coverage areas. The wireless devices may include impulse radio communication devices such as ultra-wideband radio (also known as digital pulse wireless) communication devices. The bandwidth and channel allocation of these devices and sectors can be effectively managed with the present invention despite the fact that link quality generally deteriorates near the outer boundary of the base station. This effective management is achieved by having the mobile unit maintain dual communication with a linked base station and an adjoining base station. The present invention thereby reduces the bit error rate and maintains signal strength (e.g., RF signal strength). This dual communication procedure is termed a "soft-handoff".

In the present invention the mobile units and base stations constantly monitor both signal strength and the bit error rate in order to determine whether there is a need for a hand-off. When the data integrity of a mobile unit drops below a minimum acceptable bit error rate (BER), and/or the signal strength drops below a pre-determined minimum acceptable level, a soft hand-off that maintains acceptable service will be initiated. FIG. 1 lists the typical minimum acceptable bit error rates for video, audio and data.

Advantageously, the present invention efficiently insures that a soft hand-off is performed for a mobile device as it moves from one location to another. This greatly enhances the desirability of the associated ultra-wide band system by minimizing or eliminating interruptions in communication. High quality communication is thus maintained and at the same time the ability to accommodate additional traffic is provided.

In one aspect the present invention features a method for performing a soft hand-off in a cellular communication system (preferably a code-based cellular communication system) and a corresponding computer program product. The method involves the steps of: (a) monitoring signal strength and the bit error rate from a primary source (preferably an ultra-wideband primary source); (b) monitoring signal strength and the bit error rate from a secondary source (preferably an ultra-wideband secondary source); (c) comparing the strength of the signal and the bit error rate from the primary source to the strength of the signal and the bit error rate from the secondary source; and (d) transferring data reception and transmission from the primary source to the secondary source when the strength of the signal from the secondary source is greater than the strength of the signal of the primary source, or when the bit error rate of the secondary source is less than the bit error rate of the primary source, or when either signal strength or bit error rate is below a pre-determined level. Monitoring signal strength may involve determining signal strength and storing the information in memory.

In one embodiment, the hand-off is from a first base station to a second base station to a mobile unit. In this case: (a) the first base station is linked to the mobile unit and selects an adjoining second base station; (b) the first base station contacts the second base station to request initial hand-off sequence; (c) the second base station acknowledges the request, provides a channel assignment to the mobile unit and links to the mobile unit; (d) the mobile unit transmits a hand-off release to the first base station; and (e) the first base station releases the mobile unit and completes the soft hand-off.

In another embodiment, the soft hand-off is from a mobile unit to a first base station to a second base station. In this case: (a) the mobile unit is linked to the first base station and detects an increase in bit error rate and/or a reduction in signal strength; (b) the mobile unit sends a request to the first base station for a hand-off; (c) the first base station receives the request, selects the second base station and contacts the second base station to request an initial hand-off sequence; (d) the second base station acknowledges the request for an initial hand-off sequence; (e) the second base station contacts the mobile unit, provides a channel assignment to the mobile unit and links to the mobile unit; (f) the mobile unit transmits a hand-off release request to the first base station; and (g) the first base station releases the mobile unit, and thereby completes the soft hand-off.

In still another embodiment, the soft hand-off involves dynamic power range linking. In this embodiment: (a) a mobile device is linked to a first base station and requests the position of a plurality of base stations; (b) the plurality of base stations reply; (c) the mobile unit determines and stores the location of each of the base stations; (d) each of the base stations transmits an associated rating to the mobile device; (e) the mobile device calculates the data integrity of each base station and establishes a link with a base station having the highest data integrity; and (f) the mobile device transmits a link curtailment to the first base station.

In another aspect, the invention provides a method for performing a soft hand-off in a code-based cellular communication system. The soft hand-off is from a first mobile unit to a second mobile unit to a base station. The method involves the steps of: (a) monitoring signal strength and the bit error rate from a first base station and determining that either in unacceptable; (b) attempting to locate an adjacent base station with an acceptable signal strength and bit error rate and determining that no adjacent base station has an acceptable signal strength and bit error rate; (c) transmitting a hand-off request from a first mobile device that is linked to the first base station to a second mobile device; (d) receiving a response from the second mobile device; and (e) using the second mobile device as a temporary repeater to pass data to a second base station.

In yet another aspect, the present invention provides an adaptive link controller. The adaptive link controller includes: (a) logic for monitoring the signal strength and bit error rate of a mobile unit and a plurality of base stations; (b) logic for performing dual link coordination and maintenance with a linked base station and a hand-off base station; and (c) logic for performing hand-off initiation and link curtailment.

For each of the methods of the invention described above, a corresponding computer program product is also provided. The invention also features ultra-wideband code based cellular communications systems capable of performing each of the methods of the invention. The present invention also features mobile units and base stations that are configured and structured to operate in such systems.

BRIEF DESCRIPTION OF THE DRAWINGS

The nature, goals, and advantages of the invention will become more apparent to those skilled in the art after considering the following detailed description when read in connection with the accompanying drawing in which like reference numerals identify like elements throughout, wherein:

FIG. 1 lists typical minimum acceptable bit error rates for video, audio and data in accordance with the present invention;

It will be recognized that some or all of the figures may be schematic representations for purposes of illustration and do not necessarily depict the actual relative sizes or locations of the elements shown.

DETAILED DESCRIPTION OF THE INVENTION

In the following paragraphs, the present inventions will be described in detail by way of example with reference to the attached drawings. Throughout this description, the preferred embodiment and examples shown should be considered as exemplars, rather than as limitations on the present invention. As used herein, "the present invention" refers to any one of the embodiments of the invention described herein.

I. Soft Hand-Off and Mobile Ultra-Wideband Dynamic Linking Architecture

Figure 2:
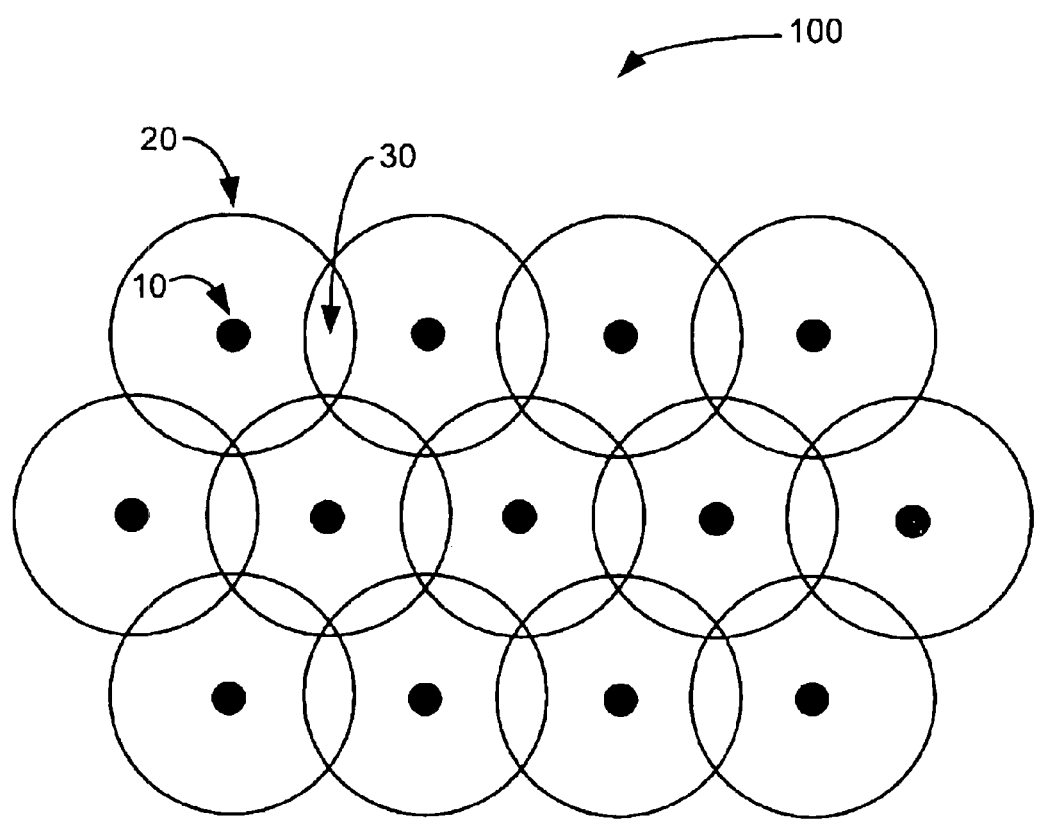
FIG. 2 shows base station architecture with overlapping coverage in accordance with the present invention.

FIG. 2 illustrates a preferred base station 10 hexagonal topology 100 that will provide overlapping coverage 30 for ultra-wideband base stations 10. Other configurations may also be used, such as a micro pico-network on a daisy chain backbone, placed like emergency call boxes along a highway, for separate routing of signals, but this configuration will allow an effective soft hand-off, which is essential for code-based cellular communications. Base station topologies can be hexagonal or linear. The hexagonal topology covers disperse user density environments whereas the linear topology mainly covers linear features such as roads. The concept is the same but the number of sectors per base station differs. Given this preferred arrangement, or other suitable arrangements, the present invention may be used in conjunction with the methods, devices, and systems described in U.S. patent application, number to be assigned, entitled "Ultra Wideband Communication System And Method", filed Dec. 13, 2000, which is incorporated herein by reference in its entirety.

The overall base station 10 architecture 100 includes a plurality of base stations 10. Each base station 10 has an associated coverage area 20, for example a substantially circular coverage area 20 as shown in FIG. 2. The coverage areas 20 of adjacent base stations 10 may overlap, thereby creating overlapping coverage areas 30. The spacing and configuration of the base stations 10 and the size and shape of the coverage areas 20 will determine the size and shape of the overlapping coverage areas 30. In the hexagonal configuration shown in FIG. 2, each base station 10 on the interior of the architecture 100 has six adjacent base stations 10, while each base station 10 on the exterior of the architecture 100 has three adjacent base stations 10.

Figure 3:
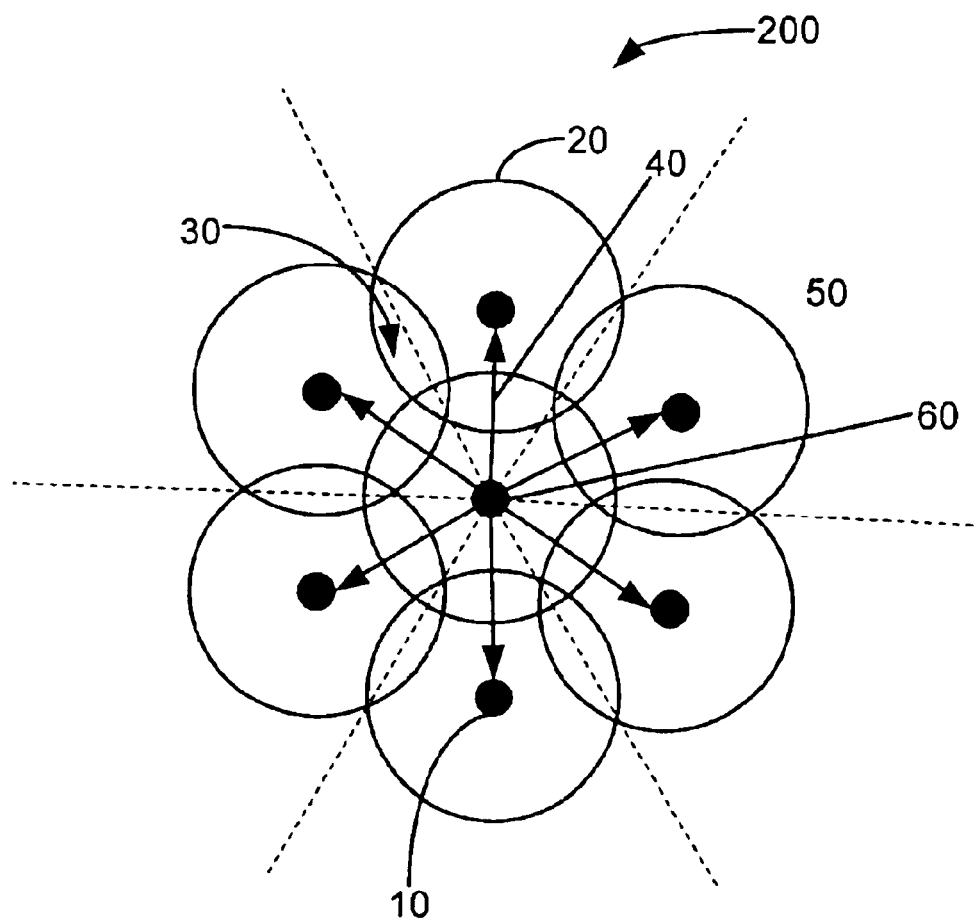
FIG. 3 shows a single base station with connectivity to six other base stations for handoff and channel coordination in accordance with the present invention.

FIG. 3 shows a single base station 10 with connectivity 40 to six other adjoining base stations 10. The station in the center 60 links with the other base stations 10 to coordinate allocated channels so that adjoining base station 10 sectors 50 do not use the same channels. The suitability of the channels may be managed using the methods and devices described in U.S. patent application Ser. No. 09/746,348 entitled "System for Pre-testing and Certification of Multiple Access Codes", filed Dec. 21, 2000, which is incorporated herein by reference in its entirety.

The linked architecture 200 also provides an interconnected communications system that is necessary to provide a "soft hand-off" as a mobile unit 70 moves from the coverage area of one base station 10 to the coverage area of another. Mobile unit 70 may be a handheld-type mobile device. Alternatively, it may be an ultra-wideband component in a mobile phone, a mobile internet device, a portable radio, a personal data assistant, a desktop computer or appliance located in a home, an automobile, or office environment or a device for similar applications.

During the "soft hand-off", the mobile unit 70 will maintain a link with both base stations 10 until the hand-off is complete. FIG. 3 also demonstrates the "sectorization" within the coverage area 20 of the base station 10. Each base station 10 is sub-divided into six coverage sectors 50. The sub-division provides greater bandwidth management in the base station's coverage area 20.

Figure 4:
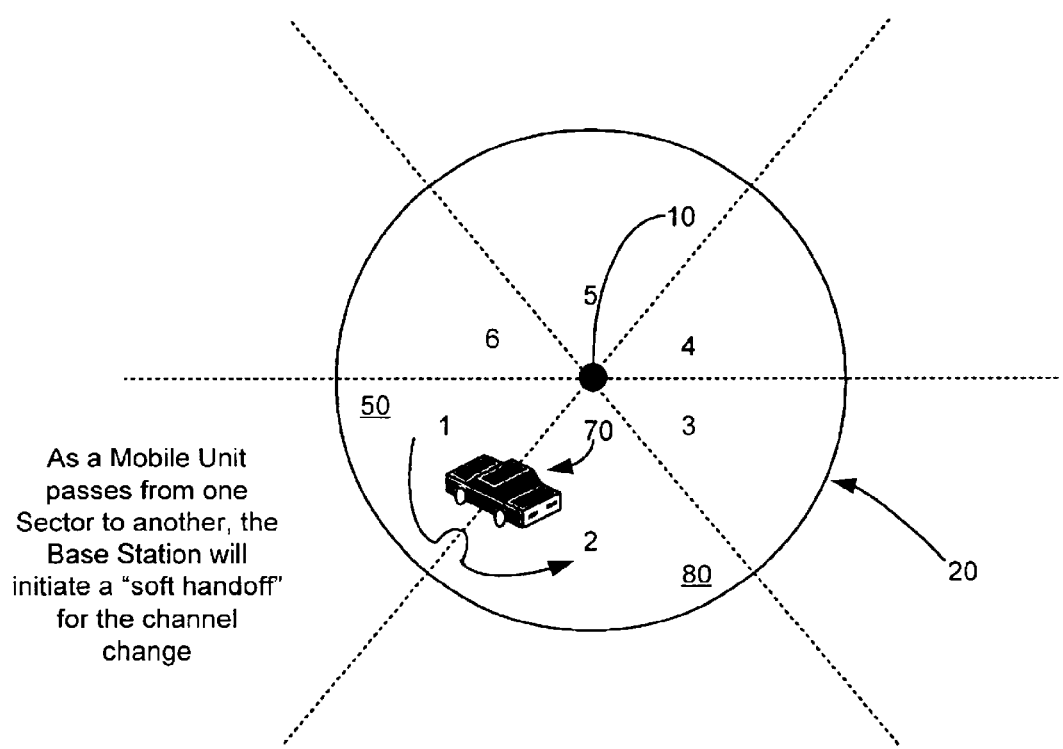
FIG. 4 shows sectorization at an ultra-wide band base station in accordance with the present invention.

FIG. 4 demonstrates that when a mobile unit 70 passes from one sector 50 to another 80 within the coverage area 20 of a single base station 10, the base station 10 will complete a "soft hand-off" as channel re-assignment is accomplished. In this case, the base station 10 will allocate a new channel for the mobile unit 70 as it moves into another sector 80, and will maintain the current allocated channel until the hand-off is complete.

II. Soft Hand-Off Scenarios

A. Scenario #1: Base Station to Receiving Base Station to Mobile Unit

Figure 5:
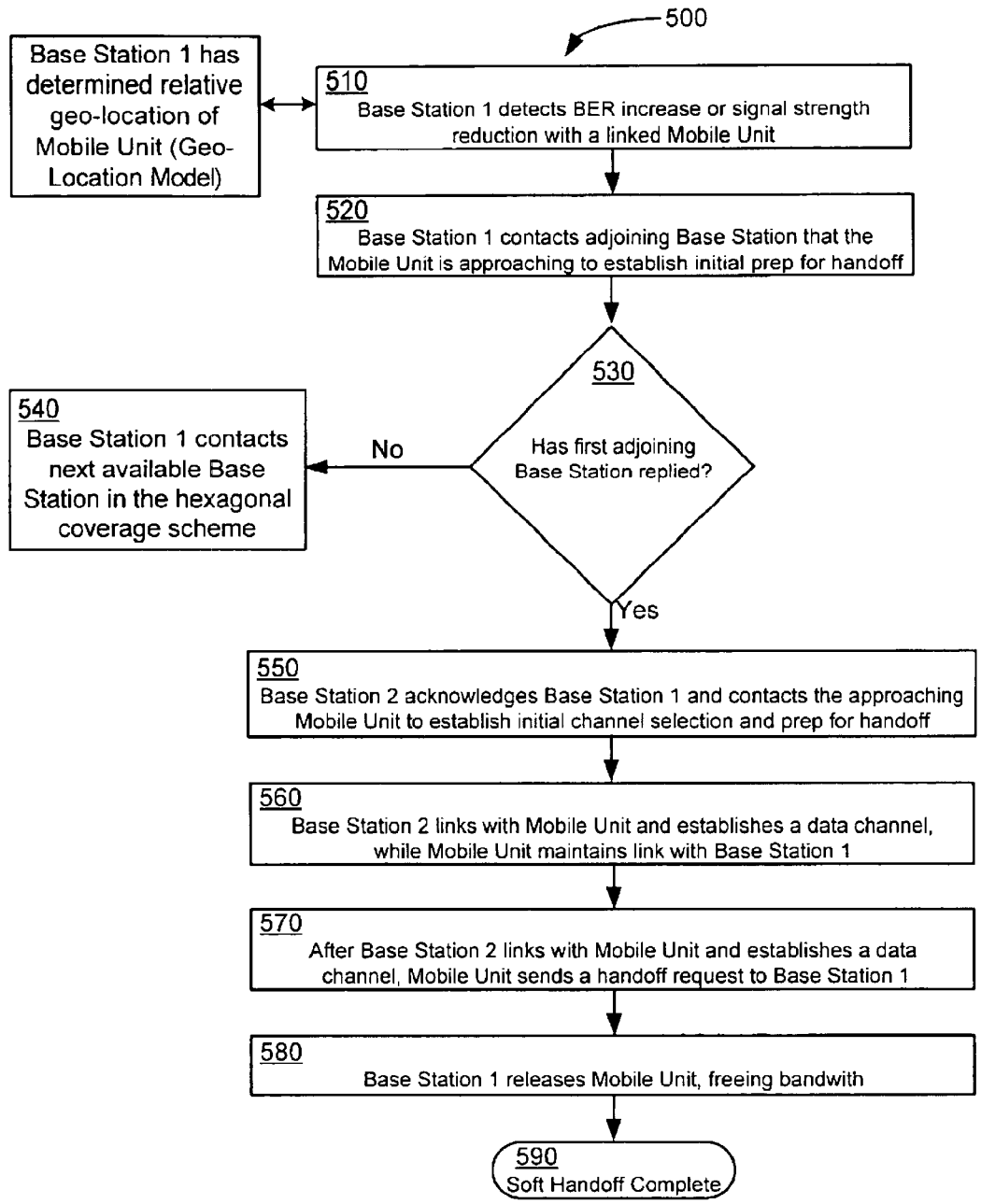
FIG. 5 is a flowchart for scenario one (a soft hand-off from base station to new base station to mobile unit) in accordance with the present invention.

FIG. 5 illustrates a preferred soft hand-off technique 500. In step 510, a base station 10 detects an increase in bit error rate and/or a reduction in signal strength (e.g., RF signal strength) using known methods. The base station 10 that is linked to the mobile unit 70 monitors the bit error rate and signal strength between all of it's linked mobile units 70, as well as their relative geo-locations. When the bit error rate exceeds the acceptable bit error rate limit or the signal strength drops below the predetermined acceptable level, the base station 10 initiates the hand-off with an adjoining base station 10. The hand-off procedure begins with the linked base station 10 selecting the most suitable adjoining base station 10. This selection is based on the calculated relative geo-positional data (obtained using known methods or as described herein) that the currently linked base station 10 has for the mobile unit 70 in relation to the best suited base station 10 within the hexagonal coverage scheme.

In step 520 the currently linked base station 10 (base station 810) contacts the selected adjoining base station 10 (base station 820) to request an initial hand-off sequence. Step 530 determines if the first adjoining base station 10 has replied using known methods. If not, then in step 540 base station 810 contacts the next available base station 10 in the hexagonal coverage scheme. Alternatively, if the first adjoining base station 10, here base station 820, has replied, then the initial hand-off sequence is given by base station 820 in step 550. This initial hand-off sequence consists of the acknowledgment to base station 810 for requested hand-off, the channel assignment selection for the mobile unit 70 and the initial contact with the mobile unit 70 by base station 820. At this time the mobile unit 70 is in communication with both base station 810 and base station 820.

After base station 820 links with the requesting mobile unit 70 in step 560 and both calculate and "acceptable" bit error rate and signal strength, the mobile unit 70 will transmit in step 570 a hand-off release request to base station 810. In step 580, base station 810 then releases the mobile unit 70, and in step 590 the soft hand-off is complete.

B. Scenario #2: Initiation by Mobile Unit in Contact with Base Station

Figure 6:
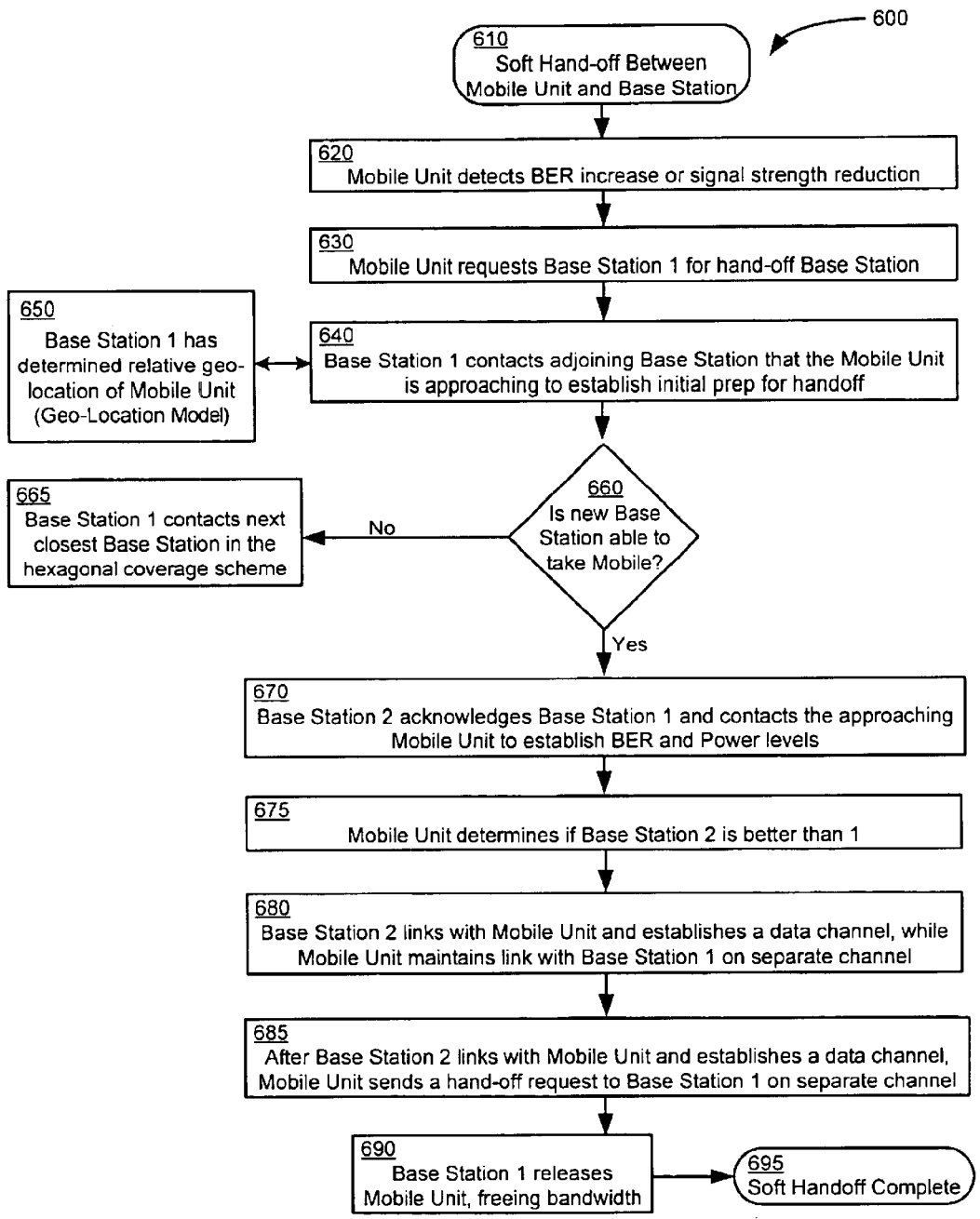
FIG. 6 is a flowchart for scenario two (a soft hand-off from mobile unit to base station to new base station) in accordance with the present invention.

FIG. 6 illustrates that when a mobile ultra-wideband unit 70 moves from one coverage area 20 to another, the hand-off process happens in multiple steps. FIG. 6 illustrates the process 600 when a base station 10 or mobile unit 70 detects, in step 620, an increase in bit error rate and/or a reduction in signal strength. In step 630, the mobile unit 70 initiates the hand-off request to the linked base station 810 if the mobile unit 70 detects the quality of service changes. When the bit error rate has exceeded the acceptable limit (e.g., see FIG. 1) or the signal strength drops below the predetermined acceptable level, the mobile unit 70 sends a request in step 640 to the linked base station 10 for a hand-off to an adjoining base station 10.

After the linked base station 10 has received the request, the hand-off procedure starts with the linked base station 10 selecting the most suitable adjoining base station 10. This selection is based on the base station 10 sector 50 occupied by the mobile user or, as in step 650, the known geo-location of the mobile unit 70 in relation to the best suited base station 10 within the hexagonal coverage scheme. Thus, at this time the base station 10 has, from step 650, an up-to-date geo-location on the mobile unit 70, and the six nearest neighbor base stations 10.

In step 640, the currently linked base station 10 (base station 810) contacts the selected adjoining base station 10 (base station 820) that it predicts to be within range of the mobile unit 70 (based on the mobile's position and direction) to request an initial hand-off sequence. Step 660 determines if the new base station 10 is able to take the mobile unit 70. If not, then in step 665 base station 810 contacts the next closest base station 10 in the hexagonal coverage scheme.

If base station 820 can accept the mobile unit 70, it sends an acknowledgement in step 670 to base station 810 and proceeds to link with the mobile unit 70. In step 670, the initial hand-off sequence by base station 820 includes the acknowledgment to base station 810 for requested hand-off, the channel assignment selection for the mobile unit 70 and the initial contact with the mobile unit 70 by base station 820. At this time the mobile unit 70 is data linked to both base station 810 and base station 820. The mobile unit 70 will remain linked to base station 810 until a confirmed Quality of Service (QOS) link with base station 820 or another base station 10 is established.

After base station 820 links with the requesting mobile unit 70, a dialogue ensues that leads to a calculation of a bit error rate and signal strength. If this bit error rate and signal strength are better than that achieved through base station 810, as determined in step 675, then in step 680 base station 820 will link with the mobile unit 70 and establish a data channel. Then, the mobile unit 70 will, in step 685, transmit a hand-off release request to base station 810. Base station 810 then releases the mobile unit 70 in step 690, and, as shown in step 695, the soft hand-off is complete.

C. Scenario #3: Mobile Ultra-Wideband Dynamic Power Range Linking

Figure 7:
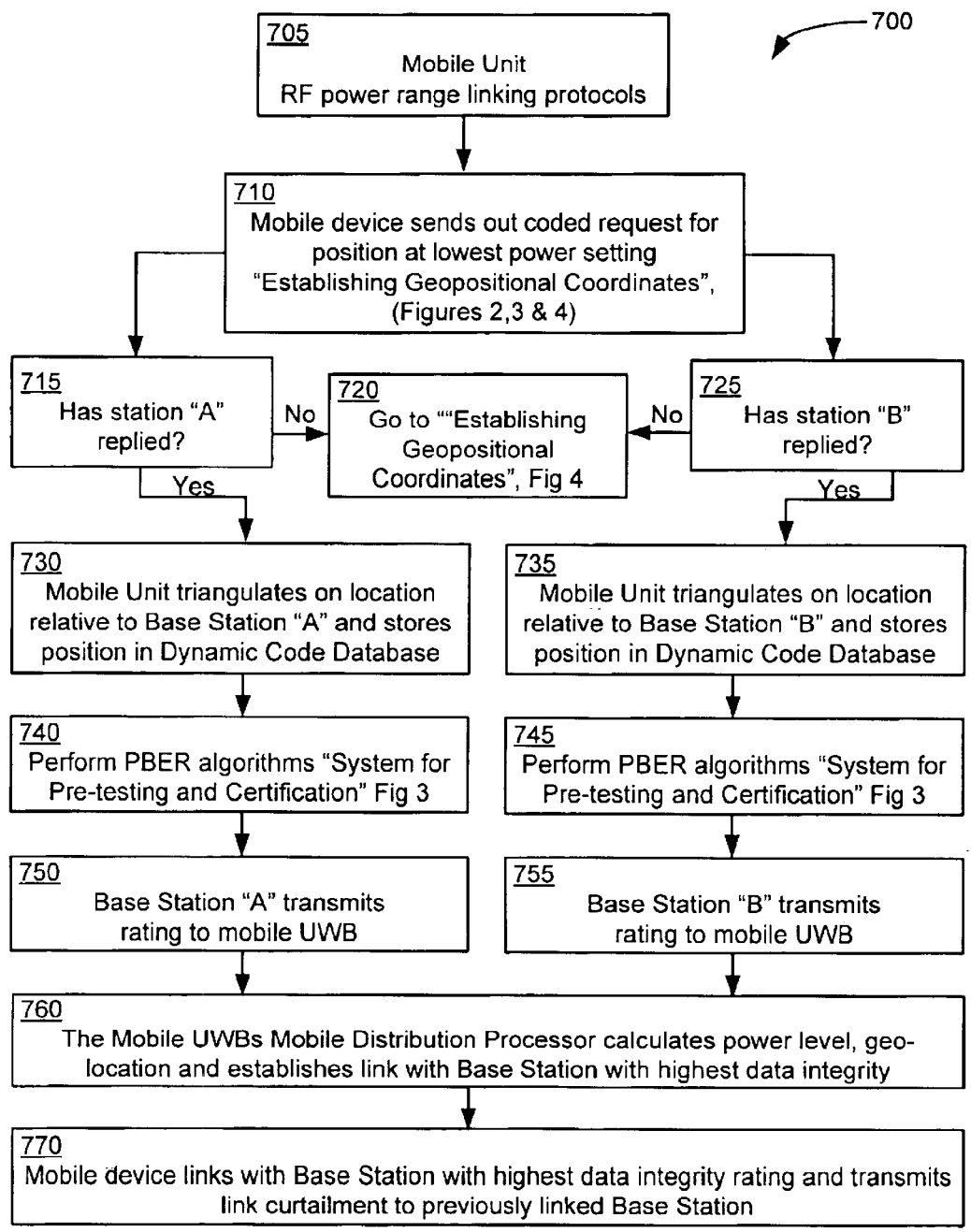
FIG. 7 is a flowchart for soft handoff scenario number three that performs dynamic power range linking in accordance with the present invention.

FIG. 7 demonstrates the principles of the ultra-wideband dynamic power range linking and soft hand-off technique 700. In this technique a mobile ultra-wideband unit 70 can determine and select a base station 10 that will provide optimum signal integrity. The process includes not only the initial "handshake" with the base station 10 providing the mobile unit 70 with optimum capability, but also provides a coordinated "soft hand-off" as required with the previously linked base station 10.

In step 710 a mobile device 70 is linked to a first base station 10 and requests the position of a plurality of base stations 10. In steps 715 and 725 it is determined if the plurality of base stations 10 reply. Once the plurality of base stations 10 reply, then in steps 730 and 735 the mobile unit 70 determines and stores the location of each of the base stations 10. The determination of the location may be done by conventional triangulation or it may be done using the methods and/or devices described in U.S. patent application Ser. No. 09/745,498, entitled "Establishing Geopositional Coordinator Using Third-Party UWB Devices", filed Dec. 22, 2000, which is incorporated herein by reference in its entirety.

In steps 740 and 745 the projected bit error rate (PBER) algorithms are performed. In steps 750 and 755 each of the base stations 10 transmits an associated rating to the mobile device 70. In step 760 the mobile device 70 calculates the data integrity of each base station 10 and establishes a link with a base station 10 having the highest data integrity. In step 770 the mobile device 70 transmits a link curtailment to the first base station 10.

Figure 8:
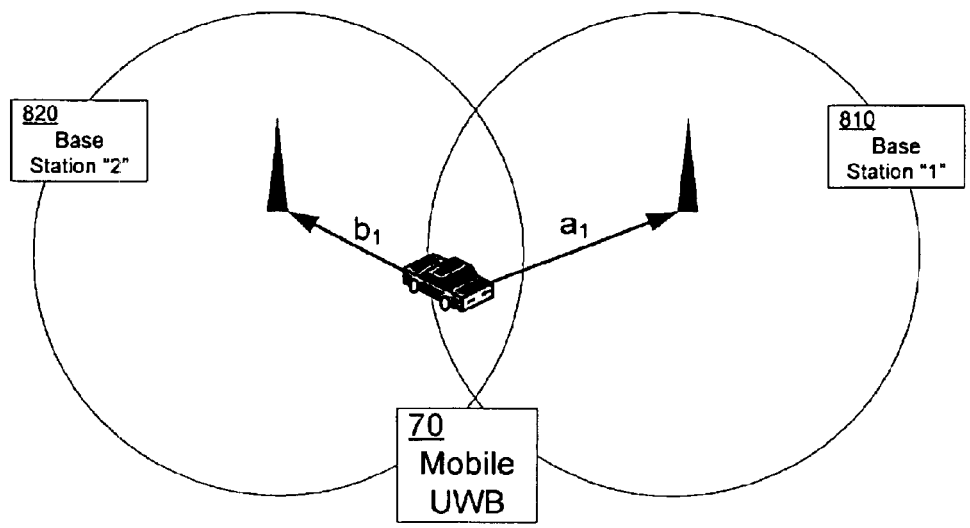
FIG. 8 is a power range linking model for soft handoff with a mobile unit leaving the coverage of base station 2 in accordance with the present invention.

This process is accomplished in a fashion that is transparent to the mobile user. FIG. 8 illustrates a mobile ultra-wideband device 70 that is within transmission range of two ultra-wideband towers 810 and 820 and is in a location that would benefit from a hand-off. In this diagram, the transmission distance to base station 810 is $a_1$, and the transmission distance to base station 820 is $b_1$. The mobile ultra-wideband device 70 will require less power (e.g., RF power) to transmit to base station 820 at distance $b_1$ than to base station 810 at distance $a_1$.

The present invention additionally manages system bandwidth by restricting power levels, such as RF power levels, in mobile ultra-wideband devices 70 to the smallest amount necessary to maintain a data link with an acceptable level of service. In FIG. 8, the limited RF power output would keep the mobile unit 70 primarily within the broadcast range of base station 820. Since the mobile ultra-wideband device's transmission is limited to base station 820, only bandwidth from base station 820 is utilized and no adjoining base station's bandwidth is encumbered. As the mobile ultra-wideband 70 moves away from the base station 10, the bit error rate will increase and the signal strength will drop to the pre-determined point where data is unacceptable and a soft hand-off will be initiated. Power level can be further minimized by combining the present invention with the technology described in U.S. patent application Ser. No. 09/677,082, entitled "Communication System", filed Sep. 29, 2000, which is incorporated herein by reference in its entirety.

D. Scenario #4: Mobile Unit to Mobile Unit to Base Station

Figure 9:
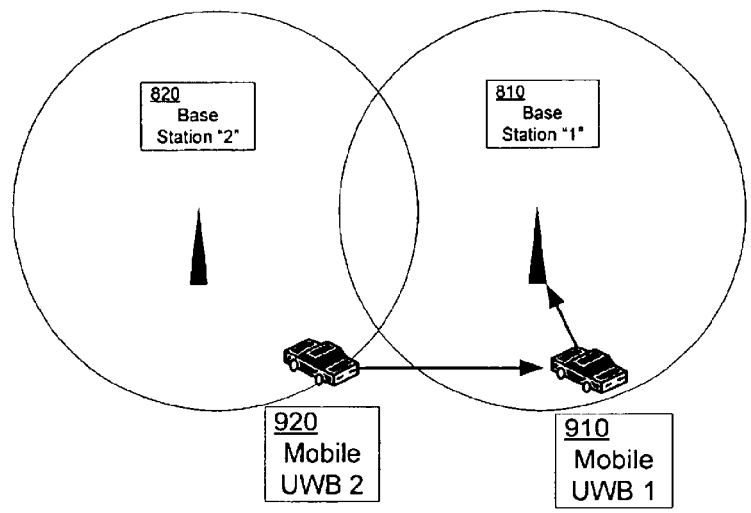
FIG. 9 shows scenario four (a soft hand-off from mobile unit to mobile unit to base station with emergency geo-locating) in accordance with the present invention.

FIG. 9 illustrates the process when a mobile unit 70 detects an increase in bit error rate and/or a reduction in RF signal strength. The mobile unit 70 also has been unable to contact another base station 10 directly and the currently linked base station 10 (base station two (820) in this case) is unable to initiate a hand-off routine to another adjoining base station 10. In this case the mobile unit 70 (mobile unit two (920)) initiates the "mobile unit to mobile unit link hand-off request" to any mobile unit 70 that will respond. The mobile unit 70 that responds to this request (mobile unit one (910)) will then perform as a temporary repeater to pass mobile unit 2 (920) geo-location data to base station one (810). This may be useful, for example, for emergency 911 linking.

III. Hand-off Procedure Cycle

Figure 10:
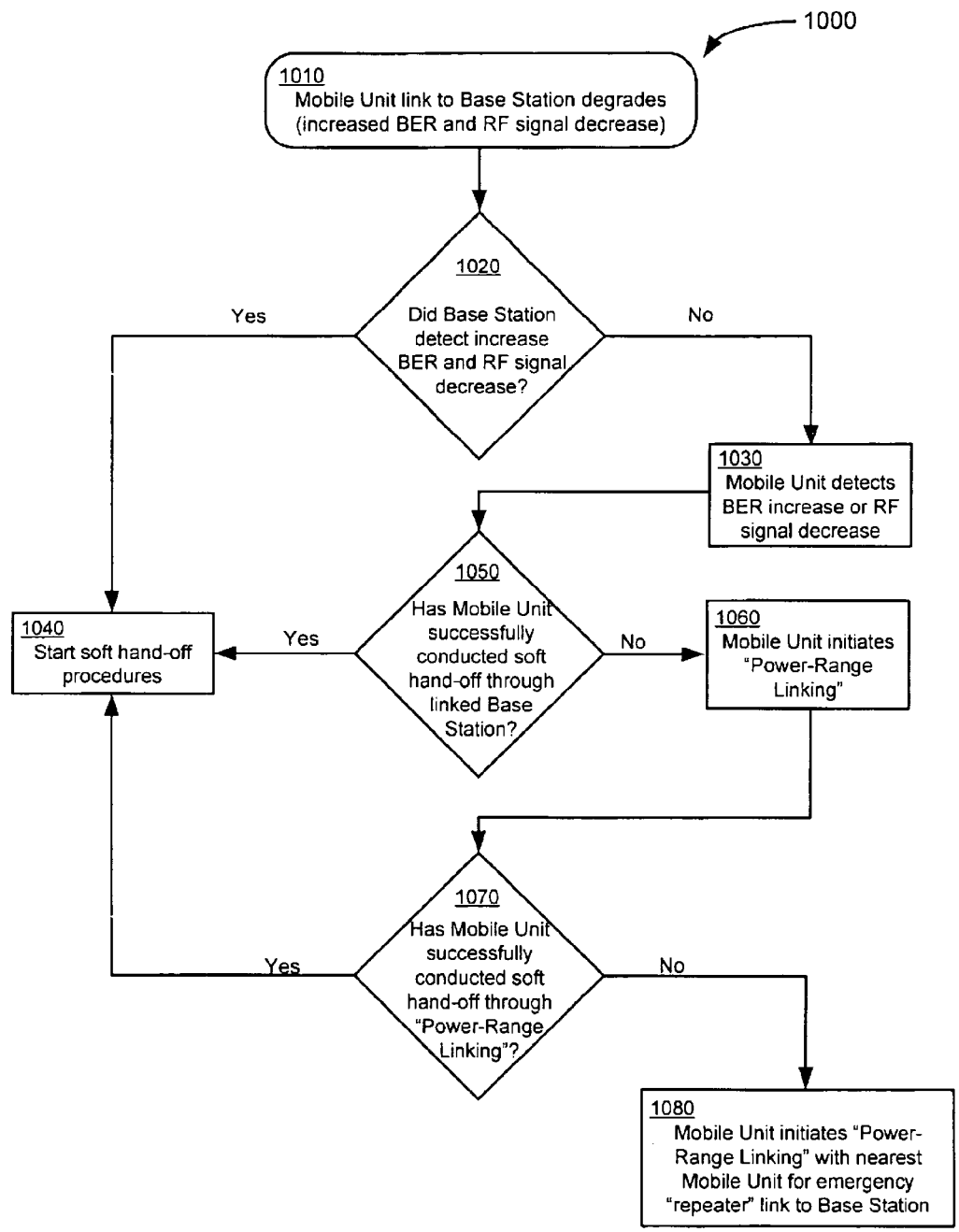
FIG. 10 is a flow chart for soft hand-off procedures for scenarios one through four in accordance with the present invention.

FIG. 10 shows the procedural flow 1000 for conducting a soft hand-off. This shows the four scenarios and the situations in which they would be conducted. When the bit error rate or the signal strength has reached the level where the quality of service is no longer acceptable, the base station 10 or the mobile unit 70 will initiate the procedures for a hand-off to an adjoining base station 10. Due to various field conditions, both the base station 10 and the mobile unit 70 have the individual capability to "request" a hand-off to another base station 10 to maintain quality of service. In the event that a mobile unit 70 cannot contact a base station 10, including the previous linked base station 10, the mobile unit 70 will conduct a "Power Range Linking" procedure. This procedure will locate and link with a neighboring mobile unit 70 for the purpose of using the contacted mobile unit 70 as a temporary repeater and as an emergency "911" link back to a base station 10.

The overall scheme 1000 begins in step 1010 when the mobile unit 70 link to base station 10 degrades, either due to an increased bit error rate or a signal decrease. In step 1020 it is determined whether the base station 10 detects the degraded link. If yes, then the hand-off procedures are initiated in step 1040. If no, then in step 1030 the mobile unit 70 detects the degraded link.

Then, in step 1050, it is determined whether the mobile unit 70 has successfully conducted a soft hand-off through the linked base station 10. If yes, then the hand-off procedures are initiated in step 1040. If no, then in step 1060, the mobile unit 70 initiates power range linking.

In step 1070 it is determined whether the mobile unit 70 has conducted a soft hand-off through power range linking. If yes, then the hand-off procedures are initiated in step 1040. If no, then the mobile unit 70 initiates power range linking with the nearest mobile unit 70 for an emergency repeater link to a base station 10.

IV. Adaptive Link Controller

An adaptive link controller (ALC) is structured to provide at least one of the following acts at a mobile unit, a base station or some combination thereof: (a) constantly monitoring the Bit Error Rate (BER); (b) after reaching a predetermined threshold, searching active cells for a link with a greater signal strength based on a minimum acceptable level; (c) monitoring signal strengths of other signals within the cell; (d) maintaining a two-way link between base stations and mobile units in hand-off process; (e) performing hand-off request and hand-off actions; (f) perfoming emergency link mangagement; (g) creating emergency message set; (h) performing an overall data link coordination; and/or (i) performing vector manipulation beam tracking.

Thus, for example, the ALC may provide the hand-off coordination and execution. As indicated in steps 1110 and 1120, the adaptive link controller monitors the bit error rate and the overall "quality of service" in both the mobile ultra-wideband unit 70 and the base stations 10. When the channel quality has dropped below acceptable level and the quality of service is diminished, the adaptive link controller in either the base station 10 or the mobile unit 70 performs the steps necessary to conduct a hand-off.

Figure 11:
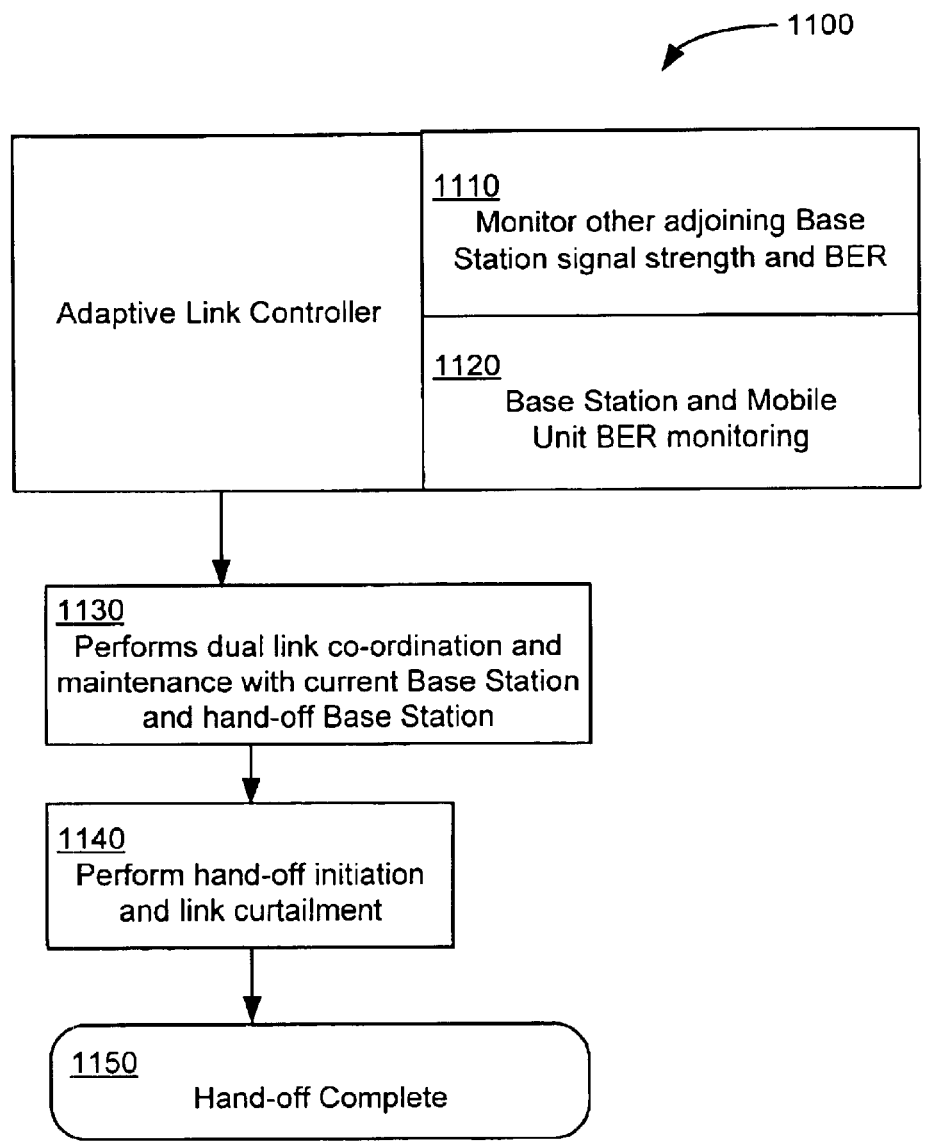
FIG. 11 depicts an adaptive link controller in accordance with the present invention.

FIG. 11 illustrates how the adaptive link controller monitors the channel quality with the assigned mobile units 70 and the adjoining base stations 10. As a mobile unit 70 traverses through the coverage area 20 of a base station 10, the mobile unit's adaptive link controller maintains the status of the link with the base station 10. Additionally, in step 1130 the base station 10 adaptive link controller monitors the link status of the mobile units 70 in its coverage area 20, as well as the "local" adjoining base stations 10 that would be used for hand-off. The adaptive link controller provides and maintains a dual link (i.e., the mobile unit 70 is in communications with two base stations 10 on two separate channels) during the hand-off process. In step 1140 the adaptive link controller initiates a link curtailment after the hand-off has effectively transferred control to the receiving base station 10.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing a soft hand-off in an ultra-wideband cellular communication system, comprising the steps of:

monitoring a signal strength and a bit error rate from a first base station;

monitoring the signal strength and the bit error rate from a second base station;

comparing the signal strength and the bit error rate from the first base station to the signal strength and the bit error rate from the second base station or to predetermined levels;

transferring data reception and transmission from the first base station to the second base station when the signal strength from the second base station is greater than the signal strength of the first base station or when the bit error rate of the second base station is less than the bit error rate of the first base station or when either signal strength or bit error rate is below a pre-determined level; wherein a mobile device is linked to the first base station and requests the position of a plurality of base stations;

the plurality of base stations reply;

the mobile unit determines and stores the location of each of the base stations;

each of the base stations transmits an associated rating to the mobile device;

the mobile device calculates the data integrity of each base station and establishes a link with a base station having the highest data integrity; and the mobile device transmits a link curtailment to the first base station.

2. A computer program product for performing a soft hand-off in an ultra-wideband code-based cellular communication system, comprising:

computer code for monitoring a signal strength and a bit error rate from a first base station;

computer code for monitoring the signal strength and the bit error rate from a second base station;

computer code for comparing the signal strength and the bit error rate from the first base station to the signal strength and the bit error rate from the second base station or to predetermined levels;

computer code for transferring data reception and transmission from the first base station to the second base station when the signal strength from the second base station is greater than the signal strength of the first base station or when the bit error rate of the second base station is less than the bit error rate of the first base station or when either signal strength or bit error rate is below a pre-determined level; wherein a mobile device is linked to the first base station and requests the position of a plurality of base stations;

the plurality of base stations reply;

the mobile unit determines and stores the location of each of the base stations;

each of the base stations transmits an associated rating to the mobile device;

the mobile device calculates the data integrity of each base station and establishes a link with a base station having the highest data integrity; and the mobile device transmits a link curtailment to the first base station.

3. A base station for an ultra-wideband code based cellular communication system comprising:

means for monitoring a signal strength and a bit error rate from the base station;

means for comparing the signal strength and the bit error rate from the base station to predetermined levels;

means for transferring data reception and transmission to a second base station; wherein a mobile device is linked to the base station and requests the position of a plurality of base stations;

the plurality of base stations reply;

the mobile unit determines and stores the location of each of the base stations;

each of the base stations transmits an associated rating to the mobile device;

the mobile device calculates the data integrity of each base station and establishes a link with a base station having the highest data integrity; and the mobile device transmits a link curtailment to the base station.

* * * * *